June 14, 1960  M. O. KALB  2,940,337
VARIABLE FORCE CONTROL SYSTEM
Filed July 3, 1958  2 Sheets-Sheet 1
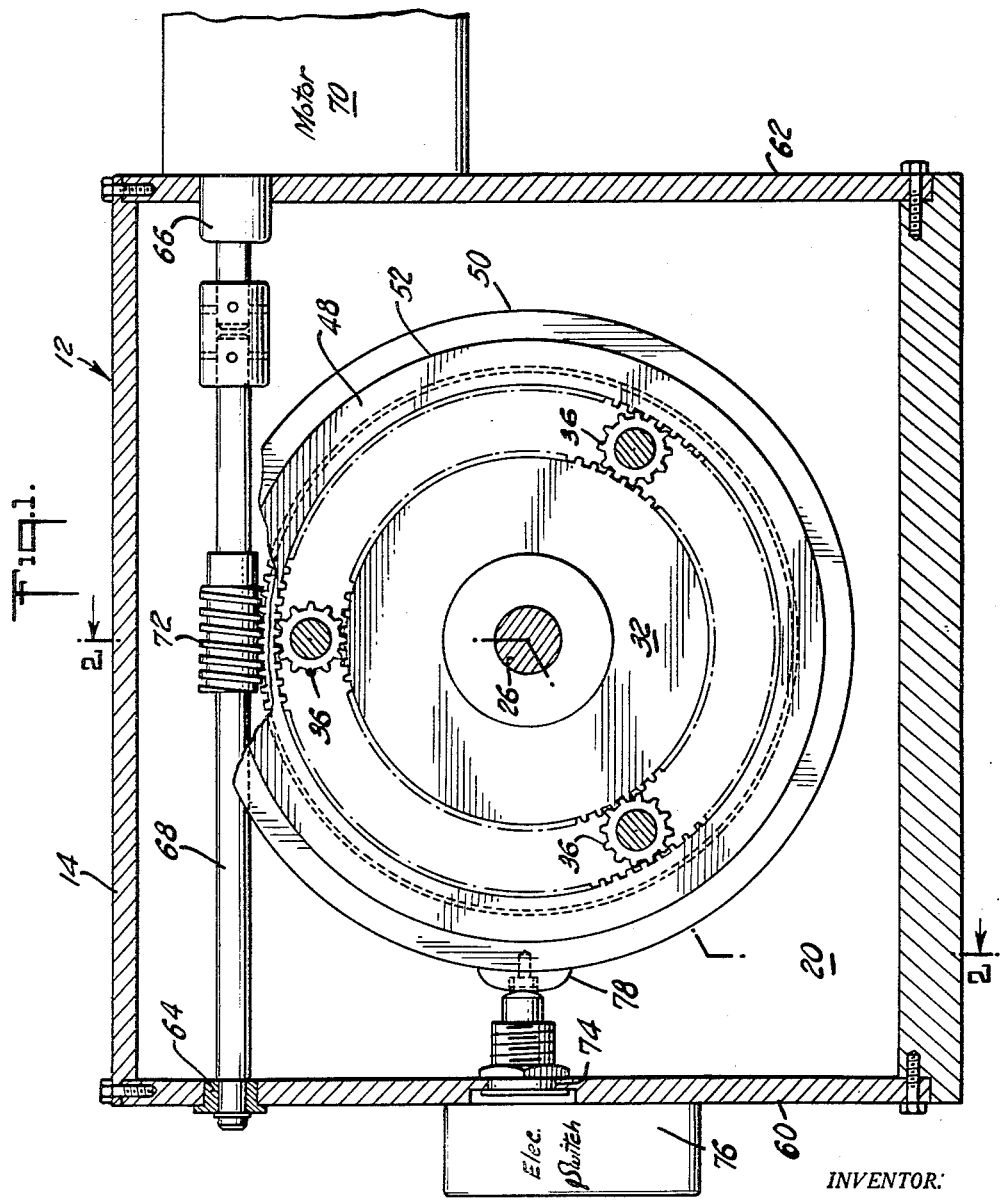
INVENTOR:
MARTIN O. KALB.

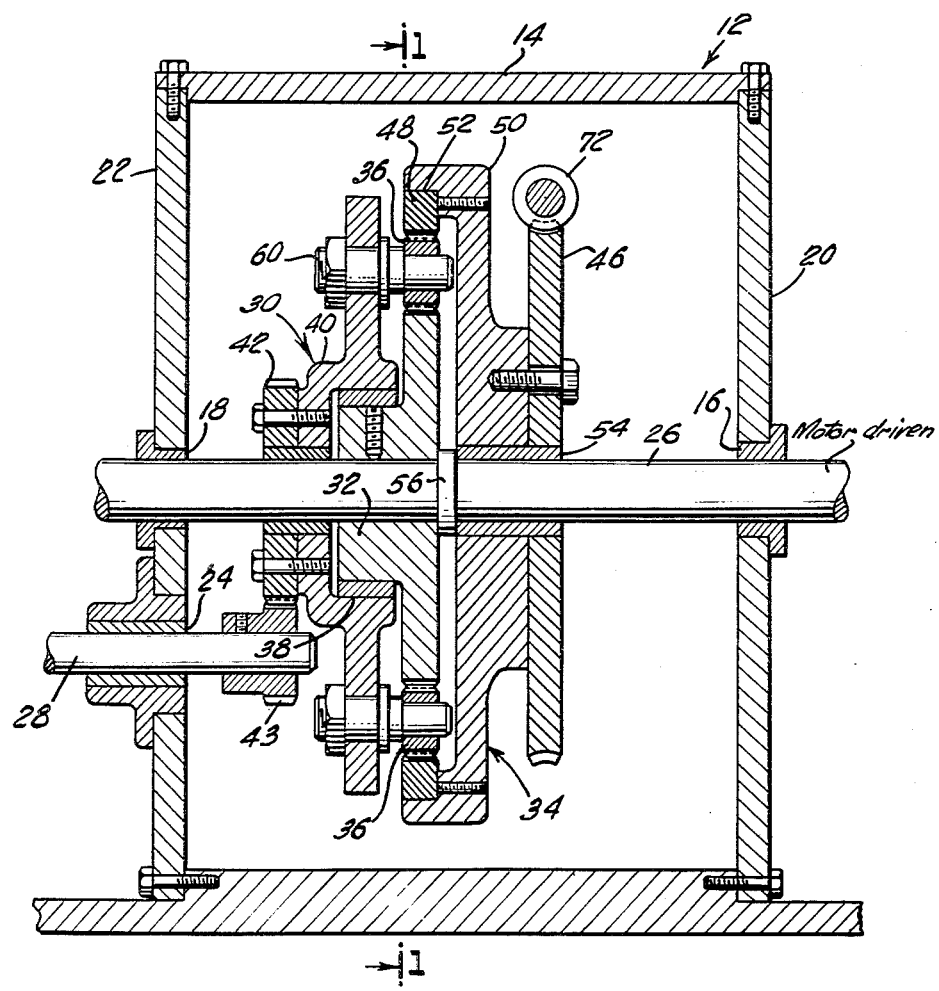

United States Patent Office 2,940,337
Patented June 14, 1960

2,940,337

VARIABLE FORCE CONTROL SYSTEM

Martin O. Kalb, 1985 Sedgwick Ave., New York 53, N.Y.

Filed July 3, 1958, Ser. No. 746,568

3 Claims. (Cl. 74—675)

(Granted under Title 35, U.S. Code (1952), sec. 266)

The invention described herein may be manufactured and used by or for the Government of the United States of America for governmental purposes without the payment of any royalties thereon or therefor.

This invention relates to an improved mechanical drive for coupling a motive power means to a plurality of rotatable members for transmitting torque from the motive power means to the rotatable members so that each of the members rotates at a speed that normally is related by a constant factor to the motor speed, which mechanical drive is selectively adjustable to change the phase relationship between a pair of the rotated members during rotation thereof, and which device can also be coupled to a second motive power means for selectively adjusting relative angular phase relationship and relative angular velocities between two members rotated by the first-mentioned motive power means. This invention has utility in establishing selectively variable mechanical vibrations in a rigid body coupled to the shafts thereof.

An object of this invention is to provide an improved mechanical device and phase shifter for use at output shaft speed on the order of several thousand revolutions per minute and which is compact, requires few parts, is inexpensive, easy to fabricate, easy to use, and efficient in operation.

Other objects and many of the attendant advantages of this invention will be readily appreciated as the same becomes better understood by reference to the following detailed description when considered in connection with the accompanying drawings wherein:

Fig. 1 is a sectional view taken along line 1—1 of Fig. 2 and Fig. 2 is a sectional view taken along line 2—2 of Fig. 1 of an embodiment of this invention.

In the illustrated embodiment of this invention, a box-like housing 12 of a rigid material and including at least one removable wall 14, supports a pair of aligned shaft bearings 16, 18 in opposed walls 20, 22 thereof. The wall 22 of the housing 12 supports a second shaft bearing 24. A driver shaft 26 is supported for rotation in the aligned bearings 16 and 18 and driven at one end by a motor, not shown. A driven shaft 28 is rotatably supported in the bearing 24. The end of shaft 26 opposite its motor-driven end and the end of shaft 28 external to housing 12 are connected to respective loads, not shown. The shafts 26 and 28 operate as primary load shaft and follower load shaft respectively.

Three members 30, 32, and 34 are arranged side-by-side in housing 12 and are rotatable independently of one another about a common axis passing through them; a plurality of non-slip planetary driving connections 36 are interposed between the two members 32 and 34 and are rotatably mounted on the third member 30. If any one of the three members is held fixed and a second one of the three members is rotated, the remaining third member rotates at a rate related continuously by a constant numerical factor to the rate of rotation of the second member; the numerical factor is a function of the radius of the planetary members 36, and the radii of the surfaces of members 32 and 34 engaged by planetary member 36 as is well known by those skilled in machine design. If the above-mentioned fixed first member is angularly adjusted or selectively rotated, the relative phase or angular velocity of the other two members rotating at related speeds are modified in accordance with adjustment or rotation of the first member.

The common axis about which the three members 30, 32, and 34 rotate coincides with the axis of one of the two shafts. This is not essential to the operation of the device but a major advantage of this arrangement is that maximum compactness is achieved. In the illustrated embodiment, the axis of the members 30, 32 and 34 coincide with driver shaft 26.

Member 32 is a gear secured to shaft 26 and having an integral axial extension supporting a bearing 38. Member 30 includes a spider 40 and a gear 42 secured to one another and rotatably supported by bearing 38 and by another bearing 44, the latter being supported by driver shaft 26. A gear 43 is fixed to driven shaft 28 for meshing engagement with gear 42. Member 34 includes a worm wheel 46 and an internal gear 48 secured together through a disk-like member 50. The pitch of gears 32 and 48 is the same. The member 34 is rotatably supported by a bearing 54 on driver shaft 26 and spaced from gear 32 by a spacer 56. Conventional ring-like or other retaining means for preventing longitudinal shifting of shafts 26, 28 in their bearing and members 30 and 34 relative to shaft 26 are omitted so as not to clutter the drawing.

Each leg of spider 40 rotatably supports one of the non-slip planetary driving connections 36 that are interposed between and engaged with the gears 32 and 48. Each non-slip planetary driving connection 36 is a gear rotatably supported on a bearing 58 that is supported by a stud 60 secured to a leg of spider 32 and parallel to the axis of driver shaft 26.

Walls 60 and 62 of housing 12 have aligned openings for bearings 64 and 66. A shaft 68 rotatable in bearings 64 and 66 is connected to a motor 70 or alternatively to a manual knob, not shown. A worm 72 is fixed on shaft 68 and in meshing engagement with worm wheel 46.

Housing wall 60 has an opening 74. A switch 76 is mounted on the housing wall and has an operating button that extends toward but does not engage the peripheral edge of disk-like member 50. A camming element 78 is secured to the peripheral edge of member 50 for actuating the switch button.

In operation, when the shaft 68 is stationary, and the shaft 26 is driven, the gear 32 rotates with shaft 26 and in meshing with gears 36 causes member 30 to rotate and the latter in turn transmits driving torque to the shaft 28. The rotation ratio of the shafts 26 and 28 depends on the gear ratios in the device. One skilled in art can readily design this device for a 1:1 ratio of shaft rotation or other desired ratios of rotation. This device is particularly useful at high shaft speeds, namely several thousand revolutions per minute. Member 34, the largest and heaviest member in the device is stationary or is moved at low speed and, therefore, consumes no driving power nor is it subject to dangerous stresses resulting from high speed rotation.

The disclosed device may be used for providing driving torque to the two load shafts 24, 26 so that they rotate in synchronism and the phase relationship of the two shafts may be selectively adjusted while they are so driven by selective rotation of shaft 68. The switch 74 may be used to stop the motor connected to shaft 26 when the phase relationship is within predetermined limits or for actuating a counter for indicating the number of revolutions one shaft is advanced over the other. The worm and worm wheel operate as a brake when the phase relationship of the shafts is not being adjusted. The disclosed device may also be used for providing driving torque to the two load shafts 24, 26 but with a selected fixed differential or a selected varying differential in angular velocity between the shafts; while shaft 26 is rotated at a constant speed, shaft 24 may be rotated at the same speed, a somewhat higher or lower speed that is either fixed or varying.

Obviously many modifications and variations of the present invention are possible in the light of the above teachings. It is therefore to be understood that within the scope of the appended claims the invention may be practiced otherwise than as specifically described.

I claim:

1. Apparatus for continuously operating two driven shafts at selective and variable relative speeds from a continuously operating drive member, and during such operation selectively advancing and retarding one of said driven shafts relative to the other of said driven shafts and varying the ratio of their angular velocities, which comprises two adjacent gears rotatable about a common axis, means for operating one of said gears continuously from said drive member, means for moving the other of said gears in angular rotation, a gear element meshing with both of said gears and mounted for bodily translation about said axis, and rotatable by the relative movements of said gears and connected to one of said driven shafts, a driving connection between said other driven shaft and said drive member, whereby by selectively controlling the relative movements of said drive member and said other of said gears, one may, during continuous operation of said drive member, operate said driven shafts simultaneously and continuously from said drive member, and during such operation of said driven shafts advance and retard said one driven shaft relative to said other driven shaft and vary the ratio of their angular velocities.

2. Apparatus for continuously operating two driven shafts at selective and variable relative speeds from a continuously operating drive element, and during such operation selectively advancing and retarding one of said driven shafts relative to the other of said driven shafts and varying the ratio of their angular velocities, which comprises two driven shafts, three adjacent members rotatable about a common axis, means drivingly connecting one of said members to the other two members so that its rotation about said axis is a function of the difference in the rotation of the other two members, means for rotating a member of said other two members continuously from said drive element, means for imparting angular motion to the other of said other two members about its axis of rotation, means connecting said one of said members to one of said driven shafts, and a driving connection between said drive element and the other of said driven shafts, whereby by selectively controlling and regulating the relative angular movements of said other two members, one may, during continuous operation of said one driven shaft by said drive element, advance or retard the other of said driven shafts and the ratio of their angular velocities.

3. Apparatus for continuously operating two driven shafts at selective and variable relative speeds and during such operation for selectively advancing and retarding one of said driven shafts relative to the other of said driven shafts and for varying the ratio of their angular velocities, which comprises two adjacent gears rotatable about a common axis, a drive motor for operating one of said gears continuously, means for selectively moving the other of said gears in angular rotation, a gear element meshing with both of said gears and mounted for bodily translation about said axis, and rotatable by the relative movements of said gears and connected to one of said driven shafts, a driving connection between said other driven shaft and said drive motor, whereby by selectively controlling the relative movements of said drive member and said other of said gears, one may, during continuous operation of said drive motor, operate said driven shafts simultaneously and continuously from said drive member, and during such operation of said driven shafts advance or retard said one driven shaft relative to said other driven shaft and vary the ratio of their angular velocities.

References Cited in the file of this patent

UNITED STATES PATENTS

| | | |
|---|---|---|
| 1,959,786 | Hodgkinson | May 22, 1934 |
| 2,618,979 | Benning | Nov. 25, 1952 |
| 2,781,616 | Estabrock | Feb. 19, 1957 |